United States Patent [19]

Lin

[11] Patent Number: 5,016,924
[45] Date of Patent: May 21, 1991

[54] JOINT ELBOW ASSEMBLY FOR WIRING

[76] Inventor: Lieh-Chao Lin, 293 Pei Tun Road, Taichung, Taiwan

[21] Appl. No.: 432,510

[22] Filed: Nov. 7, 1989

[51] Int. Cl.⁵ .............................................. F16L 43/00
[52] U.S. Cl. .................................... 285/127; 285/179; 285/915; 285/921
[58] Field of Search .................. 285/127, 179, 24, 921, 285/915; 174/71 R, 68.2, 72 R

[56] References Cited

U.S. PATENT DOCUMENTS

| 534,021 | 2/1895 | Swan | 285/179 |
| 4,508,371 | 4/1985 | Maier | 285/127 X |
| 4,730,855 | 3/1988 | Pelletier | 285/179 |

FOREIGN PATENT DOCUMENTS

| 14289 | of 1907 | United Kingdom | 285/24 |
| 104248 | 3/1917 | United Kingdom | 285/179 |
| 124082 | 3/1919 | United Kingdom | 285/179 |

Primary Examiner—Dave W. Arola

[57] ABSTRACT

A joint elbow assembly for wiring comprises a pipe elbow, two annular nuts, and a plurality of roller assemblies. The pipe elbow comprises a lower housing and a detachable upper housing. A plurality of flanges are formed on the outer periphery of the lower housing. A bracket is formed on the inner surface of the flange and two female lugs are formed on the two protruding ends of the bracket respectively. Each roller assembly which comprises two sleeves, a plurality of needle bearings and a central roller is inserted into the two female lugs. An adhesive is applied to the upper edges of the lower housing and the lower edges of the detachable upper housing.

1 Claim, 4 Drawing Sheets

JOINT ELBOW ASSEMBLY FOR WIRING

FIELD OF THE INVENTION

The present invention relates to a joint elbow and more particularly to a joint elbow assembly for wiring which comprises two corresponding housings with elbow configurations.

BACKGROUND OF THE PRESENT INVENTION

A conventional joint elbow is usually molded in one piece. In the wiring operation, the friction drag of pulling a cable or wire through a plurality of joint elbows may increase whenever more joint elbows are added. The users often smear some grease on the outer coat of the cable or wire in order to decrease the friction drag of pulling the cable or wire. The contact of the grease with the outer coat of the cable or wire may cause the outer coat of the cable or wire to become fragile and easily break over an extended period of time. Moreover, the friction between the cable or wire and the joint elbows may damage the outer coat of the cable or wire and also reduce the durability of the cable or wire.

An improved joint elbow has at least one roller which is mounted on the inner wall of the improved joint elbow. However, in the wiring operation, a user has to bend a predetermined portion of a cable or wire in advance before he threads the cable or wire through the improved joint elbow. When a plurality of joint elbows are used in the wiring operation, the user has to bend the cable or wire several times before he can thread the cable or wire through all the joint elbows. The difficulty of bending and threading the cable or wire will increase whenever more joint elbows are added.

SUMMARY OF THE PRESENT INVENTION

The principal object of the present invention is to provide a joint elbow assembly for wiring which comprises two corresponding housings so that a user can open the detachable upper housing to directly position and bend a cable within the hollow interior of the lower housing and then dispose the lower edges of the detachable upper housing on the upper edges of the lower housing and screw in two nuts so as to easily position the bended portion of the cable within the joint elbow assembly.

The second object of the present invention is to provide a joint elbow assembly for wiring which comprises a plurality of central rollers in order to provide a smooth movement for the cable as the cable is pulled through the joint elbow assembly and to decrease the friction drag between the cable and the joint elbow assembly while the user is pulling the cable.

DESCRIPTION OF THE PREFERRED EMBODIMENT

Figure 1:
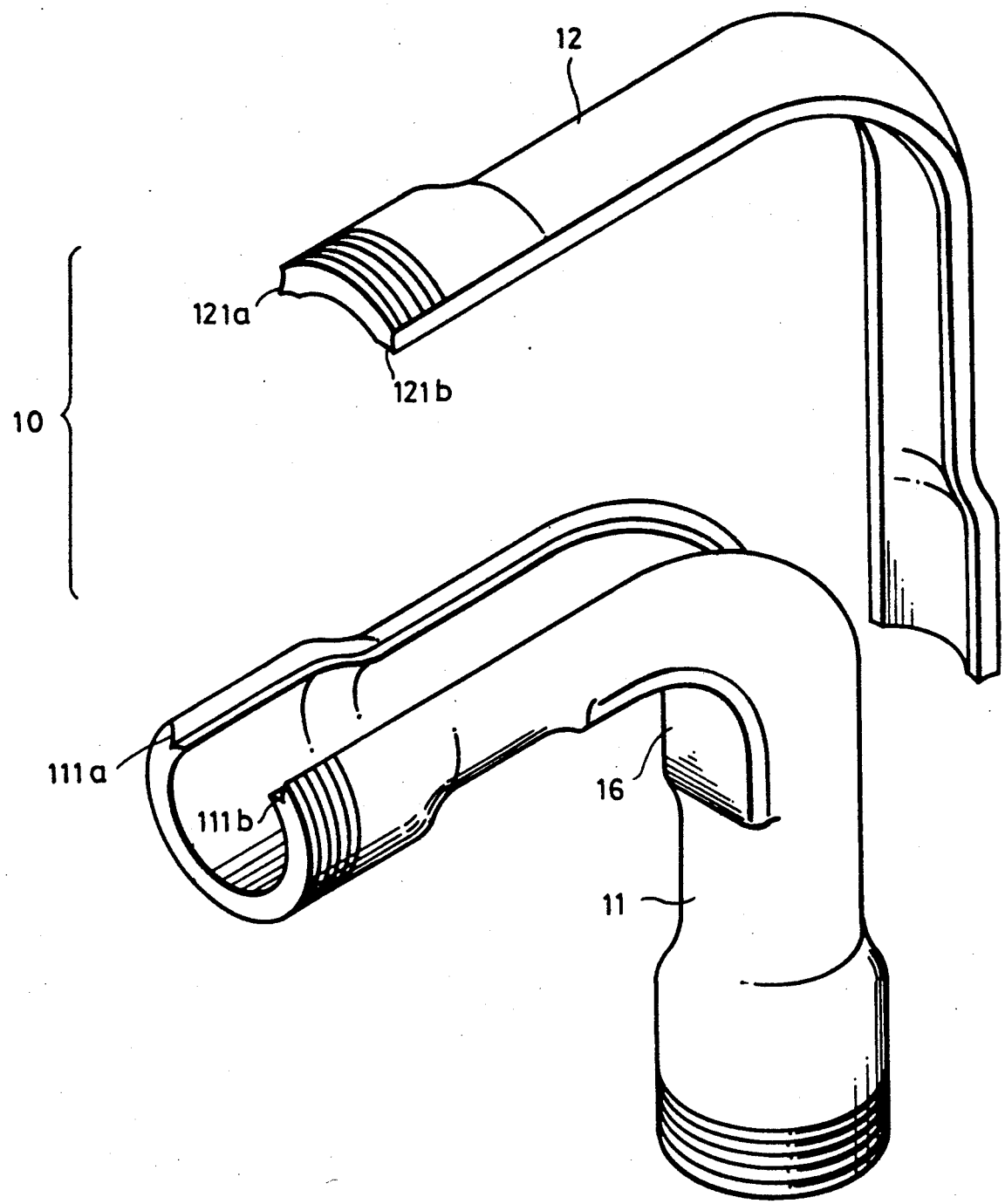
FIG. 1 is an exploded view of a pipe elbow of a preferred embodiment in accordance with the present invention.
Figure 2:
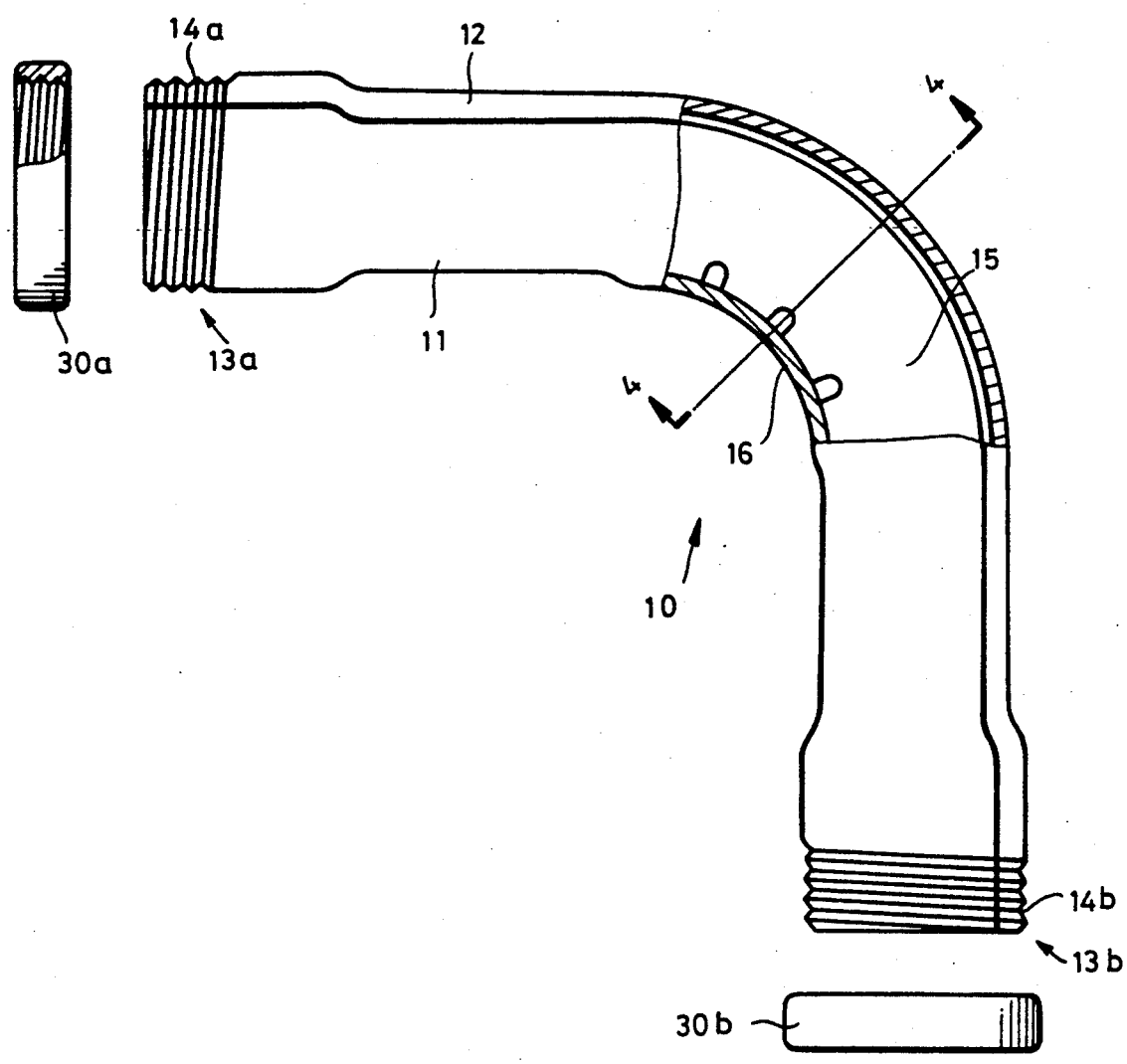
FIG. 2 is a partly cross-sectional, elevational view of a joint elbow assembly for wiring of a preferred embodiment in accordance with the present invention.
Figure 3:
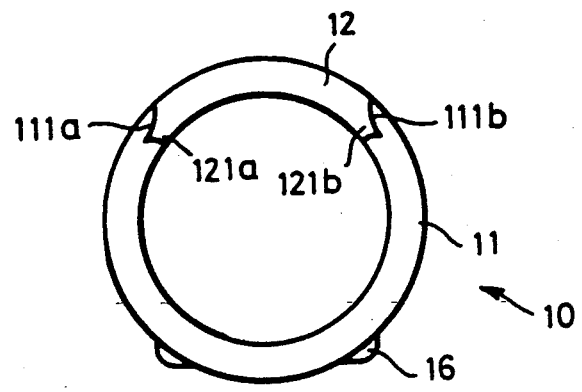
FIG. 3 is an end view of a pipe elbow of a preferred embodiment in accordance with the present invention.

Referring to FIGS. 1 to 3 of the drawings, a joint elbow assembly for wiring comprises a pipe elbow 10, three roller assemblies 20, and two annular nuts 30a, 30b. The pipe elbow 10 comprises a lower housing 11 and a detachable upper housing 12. The cross-sectional width of the detachable upper housing 12 is approximately one third of that of the lower housing 11. The first and second protrusions 121a, 121b which are defined by the two lower edges of the detachable upper housing 12 are disposed respectively at the corresponding positions of the first and second grooves 111a, 111b which are defined by the two upper edges of the lower housing 11 respectively. The detachable upper housing 12 and the lower housing 11 are connected by snapping the first and second protrusions 121a, 121b into the first and second grooves 111a, 111b, respectively, to form a pipe elbow 10. An adhesive is applied to the edges of the first and second protrusions 121a, 121b and the first and second grooves 111a, 111b. The two end portions 13a, 13b of the pipe elbow 10 have respective external threads 14a, 14b formed on their outer peripheries so that the corresponding annular nuts 30a, 30b can be screwed on to rigidly secure the detachable upper housing 12 to the lower housing 11. Thus a cable can be positioned between the inner wall 15 of the lower housing 11 and the detachable upper housing 12.

Figure 4:
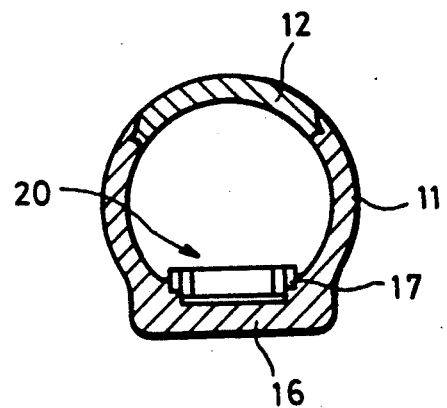
FIG. 4 is a cross-sectional view of a pipe elbow along the line 4—4 of FIG. 2.
Figure 5:
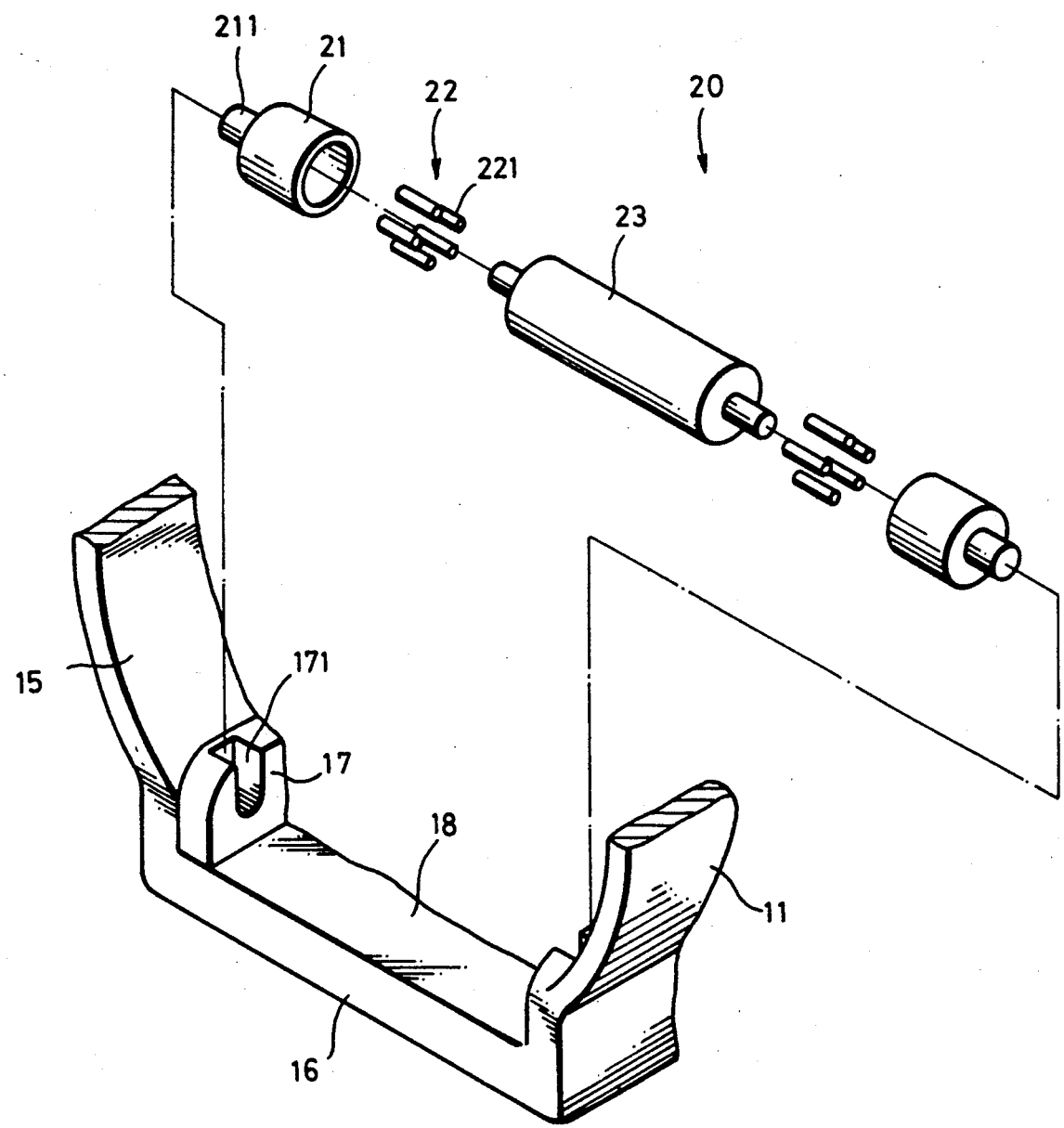
FIG. 5 is an exploded view of a roller assembly of FIG. 2.

Referring to FIGS. 2, 4 and 5, three flanges 16 are spacedly formed on the outer periphery of the central lower portion of the lower housing 11. A seat 18 is formed on the inner surface of the flange 16. Two female lugs 171 are formed on the two protruding ends 17 which are disposed on the two ends of the seat 18 respectively. A roller assembly 20 comprises a pair of sleeves 21, two needle bearing sets 22, and a central roller 23. Each needle bearing set 22 comprises a plurality of needle bearings 221. The two ends of the central roller 23 are rotatably secured by the pair of sleeves 21, each with a hollow interior. The two needle bearing sets 22 are inserted into the hollow interiors of the two sleeves 21 respectively. Each sleeve 21 has a protruding spindle 211. The protruding spindle 211 of the two sleeves 21 are fixedly inserted into the two female lugs 171 respectively. The roller assembly 20 serves to decrease the friction between the cable and the joint elbow assembly while the user is pulling the cable through the joint elbow assembly.

The operation of the present invention is described as follows. The user should open the detachable upper housing 12 before installing the cable. The cable is bent according to the curvature of the lower housing 11 so that the cable can be directly positioned adjacent to the inner wall 15 of the lower housing 11. After the cable is bent, the user can position the cable within the lower housing 11 directly. The cable is passed through the second nut 30b, and then the adhesive is applied to the edges of the two protrusions 121a, 121b and the two grooves 111a, 111b to create adhesion between the upper housing 12 and the lower housing 11 so that the upper housing 12 and the lower housing 11 will be joined together. The two protrusions 121a, 121b and the two grooves 111a, 111b are then snapped together, and the two end portions 13a, 13b of the pipe elbow 10 can be secured by screwing on the two nuts 30a, 30b so that the upper housing 12 and the lower housing 11 are rigidly secured together. When the user pulls the cable through the joint elbow assembly, the friction drag between the roller assembly 20 and the cable is very small so that the user can easily pull the cable through the joint elbow assembly without damaging the cable.

I claim:

1. A joint elbow assembly for wiring comprising:

a pipe elbow with a plurality of threads formed on the outer peripheries of a first and second end portions of said pipe elbow respectively;

said pipe elbow comprising a lower housing and a detachable upper housing, the cross-sectional width of said detachable upper housing being approximately one third of that of said lower housing;

a first and a second annular nuts screwing on to said first and second end portions of said pipe elbow respectively;

a first and a second grooves defined by a first and a second upper edges of said lower housing;

a first and a second protrusions defined by a first and a second lower edges of said detachable upper housing;

at least two flanges spacedly formed on the outer peripheries of the central lower portion of said lower housing respectively;

a seat formed on the inner surface of each said flange;

a pair of a first and a second female lugs formed on a first and second protruding ends of each said seat respectively;

a corresponding roller assembly inserted in each pair of said first and second female lugs;

each said roller assembly comprising a central roller, a first and a second sleeves with hollow interior, and a first and a second needle bearing sets;

each said needle bearing set comprises a plurality of needle bearings;

each said needle bearing set inserted in the hollow interior of each said first and second sleeves respectively;

a first and a second ends of each said central roller rotatably secured by said first and second sleeves respectively;

each said sleeve having a protruding spindle;

each said protruding spindle fixedly inserted into each pair of said first and second female lugs respectively;

an adhesive applied to the edges of said first and second protrusions and said first and second grooves;

whereby said upper housing and lower housing are snappedly connected by said first and second protrusions and said first and second grooves respectively and joined by said adhesive and said first and second nuts.

* * * * *